Figure 4:
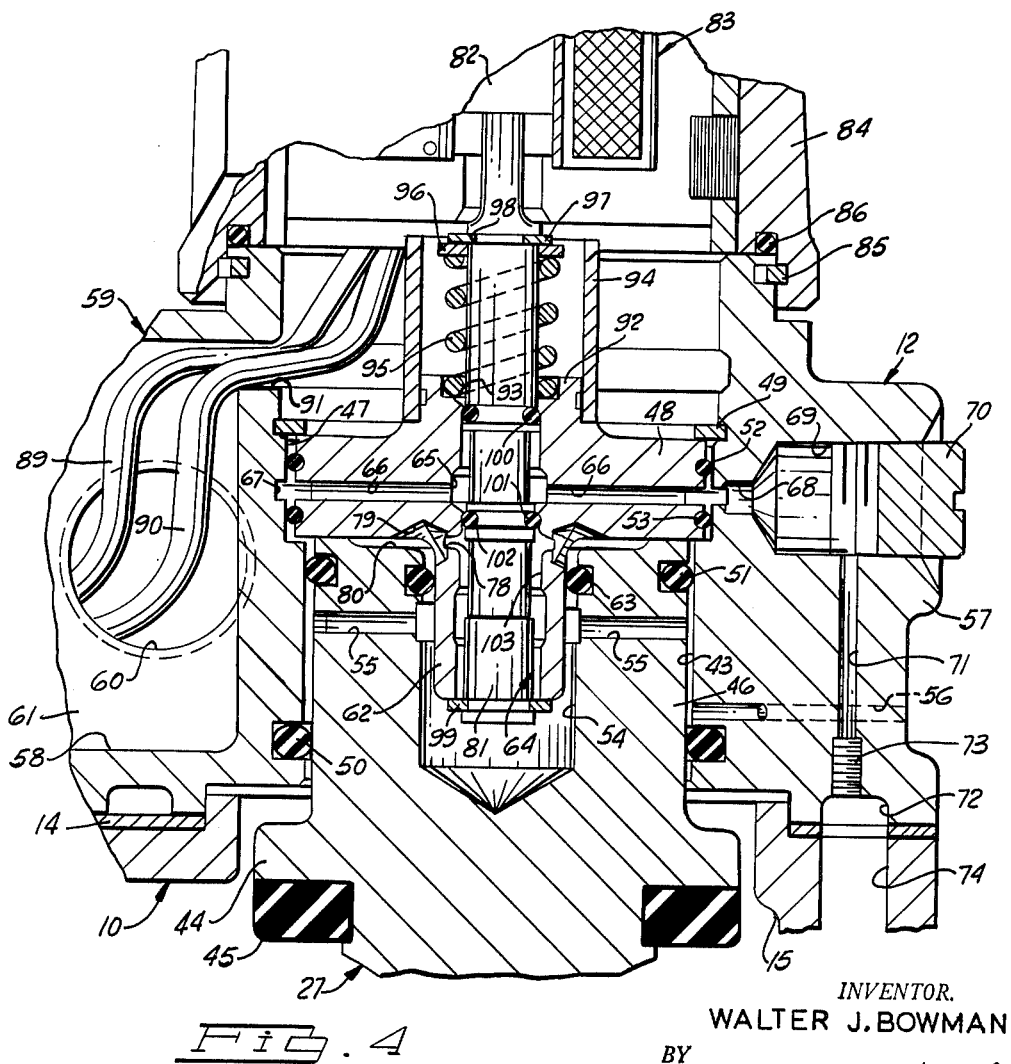

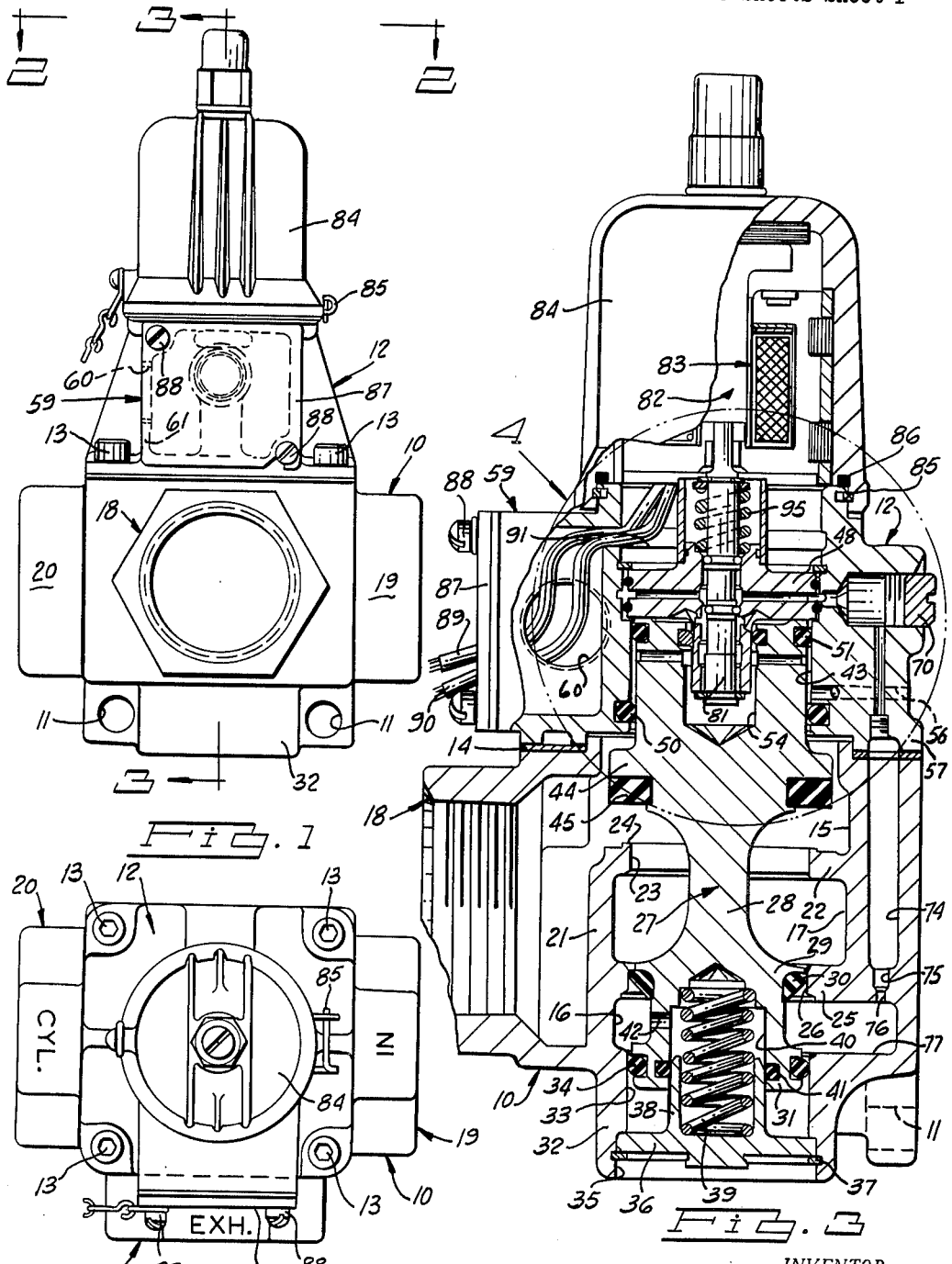

INVENTOR.
WALTER J. BOWMAN

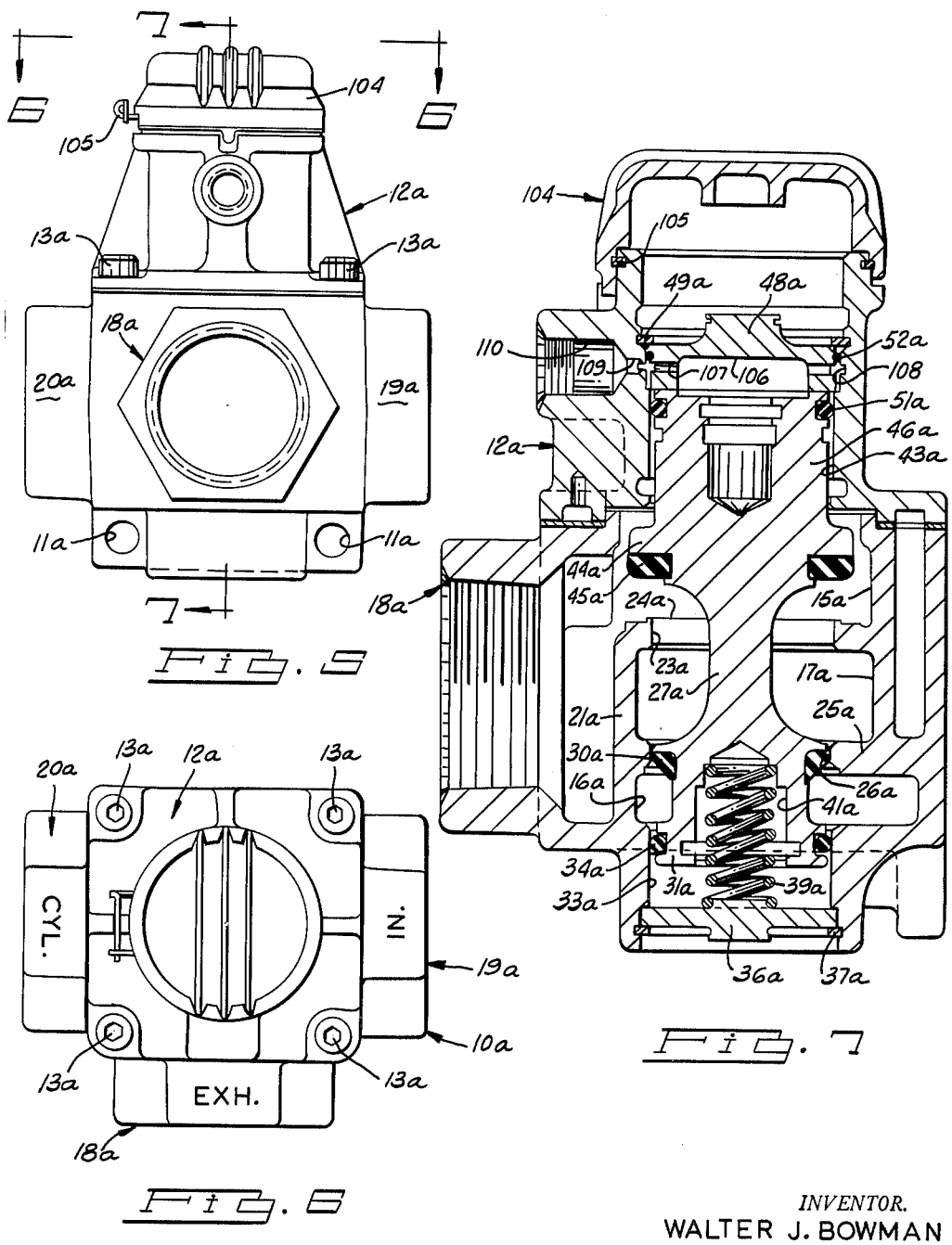

United States Patent Office 3,238,972
Patented Mar. 8, 1966

3,238,972
PILOT OPERATED 3-WAY IN-LINE VALVE
Walter J. Bowman, Detroit, Mich., assignor to Mac Valves, Inc., Detroit, Mich., a corporation of Michigan
Filed Nov. 30, 1962, Ser. No. 241,188
8 Claims. (Cl. 137—625.64)

This invention relates generally to improvements in air valves, and more particularly to a new and useful pilot operated, three-way, in-line air valve for controlling the flow of pressurized air to and from a press clutch, an air brake, an air cylinder, or any other device where fast control of large volumes of air is required.

In order to operate a high speed press with the prior art type valves, it is often necessary to provide a separate quick dump valve together with a flow control or operating valve, or a much larger valve, in order to provide safe and positive stopping of the press to prevent the press from repeating. The requirement of two valves or said larger valve is costly, and space consuming, and such an arrangement inherently has many more parts which may fail and cause trouble during the operation of a press or the like. Accordingly, it is an important object of the present invention to provide a novel and improved pilot operated three-way, in-line air valve, which is adapted to perform both the function of a quick dump valve and the function of a control valve, to control the operation of a press or the like. The valve of the present invention incorporates a balanced poppet valve structure which allows restriction or muffling of the valve exhaust without adversely affecting the operation of the valve. The valve of the present invention is capable of quickly supplying and exhausting large volumes of pressurized air, to and from, an apparatus to be controlled, as the clutch for a press, an air cylinder, an air brake or the like.

It is another object of the present invention to provide a novel and improved pilot operated three-way, in-line air valve having a spool balanced and neutralized for internal pressures and incorporating both fixed poppet valve and radial slide valve principles and which is constructed to provide quick and efficient seating with minimum seating pressure.

It is another object of the present invention to provide a novel and improved pilot operated three-way, in-line air valve which includes a body having an exhaust chamber in the upper end thereof, an air supply chamber in the lower end thereof, and a cylinder chamber disposed between the exhaust and the supply chambers, and, wherein said chambers are disposed in vertical alignment with each other, and, wherein said valve includes an air pressure balanced master poppet spool for controlling the flow of air between said chambers in a fast and efficient manner.

It is a further object of the present invention to provide a novel and improved pilot operated three-way, in-line air valve provided with aligned exhaust, supply and cylinder chambers with a master poppet spool valve operable to control the flow of air between said chambers, and, wherein the master poppet spool valve is spring operated in one direction and pressure operated in the other direction by pressurized air controlled by either an internally located pilot means in the valve, or by an externally located pilot means.

Other objects, features and advantages of this invention will be apparent from the following detailed description, appended claims, and the accompanying drawings.

In the drawings:
FIG. 1 is a side elevational view of a pilot operated three-way in-line valve made in accordance with the principles of the present invention;
FIG. 2 is a top plan view of the valve illustrated in FIG. 1, taken along the line 2—2 thereof, and looking in the direction of the arrows;
FIG. 3 is a partial elevational, sectional view of the valve structure illustrated in FIG. 1, slightly enlarged, taken along the line 3—3 thereof, and looking in the direction of the arrows;
FIG. 4 is a fragmentary, enlarged sectional view of the structure illustrated in FIG. 3, taken within the circle indicated by the numeral 4;
FIG. 5 is a side elevational view of a second embodiment of the invention and which is constructed for remote pilot operation;
FIG. 6 is a top plan view of the structure illustrated in FIG. 5, taken along the line 6—6 thereof, and looking in the direction of the arrows; and
FIG. 7 is an enlarged elevational, sectional view of the valve structure illustrated in FIG. 5, taken along the line 7—7 thereof and looking in the direction of the arrows.

Referring now to the drawings, and in particular to FIGS. 1 through 4, the numeral 10 generally indicates the valve body which is provided with a plurality of suitable bolt holes 11 for mounting a body 10 in place at a desired location. Detachably mounted on the top of the body 10, is the pilot housing generally indicated by the numeral 12. The housing 12 is secured to the body 10 by means of a plurality of bolts 13. A suitable gasket 14 is mounted between the body 10 and the housing 12.

The body 10 is substantially square in cross section and is provided in the upper end thereof with the exhaust chamber 15, and in the lower end thereof with the inlet or supply chamber 16. Disposed between the exhaust chamber 15 and the supply chamber 16, is the cylinder chamber 17 which is adapted to be connected to a device to be supplied with air under pressure, as for example, an air cylinder, a press clutch or the like. The chambers 15, 16 and 17 are vertically aligned as shown in FIG. 3. The exhaust chamber 15 is connected to the exhaust port 18, the supply chamber is connected to the supply port 19, and the cylinder chamber 17 is connected to the cylinder port 20.

The exhaust port 15 is separated from the cylinder port 17 by means of the vertical annular wall 21 and the horizontal wall 22. As shown in FIG. 3, the horizontal chamber wall 22 is provided with a large passageway, or circular opening 23 for communicating the exhaust chamber 15 with the cylinder chamber 17. A valve seat 24 is formed on the outer face of the wall 22 for an operative purpose as described hereinafter in detail.

The supply chamber 16 is separated from the exhaust chamber 15 by means of the wall 21 and from the cylinder chamber 17 by means of the dividing wall 25. As shown in FIG. 3, a large passageway or circular opening 26 is formed through the dividing wall 25 and communicates the supply chamber 16 with the cylinder chamber 17. It will be obvious that in use the supply port 19 will be connected by suitable conduits to a source of pressurized air. The exhaust port 18 would be exhausted to the atmosphere and the cylinder port 20 would be connected by suitable conduits to the apparatus to be supplied and exhausted with air.

As shown in FIG. 3, a master spool valve generally indicated by the numeral 27 is operatively mounted in the valve body 10. The spool valve 27 is provided with a reduced annular shaft portion 28 which is disposed within the cylinder chamber 17 and partially in the exhaust chamber 15 when the spool valve 27 is in the exhaust position shown in FIG. 3. Integrally formed on the lower end of the valve spool portion 28 is the enlarged valve head 29 which is provided with the annular seal member 30. The valve seal member 30 is adapted to engage the wall of the passageway 26 between the cylinder chamber 17 and the supply chamber 16 to provide a sealing action therebetween and block off flow of air between these chambers when the spool valve 27 is in the position shown in FIG. 3. The spool valve 27 is further provided on the lower end thereof with the annular end portion 31. The valve end portion 31 is provided with an outer diameter substantially equal to the outer diameter of the valve portion 29.

As shown in FIG. 3, the valve body 10 is provided with a downwardly extended integral circular extension 32 which is provided with the inner bore 33 that communicates with the supply chamber 16. The valve annular end portion 31 extends downwardly through the supply chamber 16 and into the extension bore 33. A suitable O-ring sealing means 34 is operatively mounted around the valve lower end portion 31 and sealingly engages the surface of the bore 33. The outer end of the bore 33 is enlarged as indicated by the bore 35 and it communicates with the atmosphere. Seated in the bore 35 is a lower retainer 36 which is circular in cross section and is retained in the bore 35 by means of the conventional clip ring 37. As shown in FIG. 3, the lower retainer 36 is provided on the inner side thereof with the central inwardly extended tubular projection 38 in which is seated the lower end of the return spring 39. The upper end of the spring 39 is seated in the axial bore 40 formed in the lower end of the valve end portion 31. The tubular projection 38 on the retainer 36 is adapted to be slidably received in the bore 40 in the valve end portion 31. A suitable O-ring sealing means 41 is mounted within the bore 40 and sealingly engages the outer surface of the tubular retainer extension 38. As shown in FIG. 3, the spring 39 is adapted to bias the spool valve 27 upwardly to the position wherein the supply cylinder 16 is sealed from the cylinder chamber 17. The bore 40 in the valve end portion 31 is interconnected with the supply chamber 16 by means of the passageway 42 formed through the valve end portion 31.

As shown in FIG. 3, the exhaust chamber 15 is open on the upper end thereof and communicates with the circular pilot chamber or bore 43 formed in the pilot housing 12. The master spool valve 27 includes the second enlarged valve portion 44 on the upper end of the reduced portion 28. The valve portion 44 is mounted in the exhaust chamber 15 and is provided with the downwardly facing annular valve seal 45 which is adapted to be seated on the annular valve seat 24 when the master spool valve 27 is moved downwardly, as described hereinafter in detail. The upper end of the master spool valve 27 comprises the annular integral pilot extension 46 which is movably disposed with the pilot chamber 43 and which is provided with an outer diameter substantially equal to the outer diameter of the valve head 29 and the valve end portion 31. It will be seen that the bores 23, 26, 33 and 43 are equal in diameter to provide the spool valve 27 with a balanced condition, no matter what position it is in.

As best seen in FIG. 4, the upper end of the pilot chamber 43 is enlarged as indicated by the numeral 47 and seated within the enlarged bore portion 47 is the pilot retainer 48. The pilot retainer 48 is provided with a circular cross section and is releasably secured in place by means of the conventional retainer ring 49. As shown in FIG. 3, the spring 39 normally shifts the master spool valve 27 upwardly into abutting engagement with the pilot retainer 48. As shown in FIG. 4, an O-ring sealing means 50 is mounted in the pilot housing 12 around the bore 43 and sealingly engages the outer annular surface of the master spool pilot portion 46. A suitable O-ring sealing means 51 is operatively mounted on the upper end of the pilot portion 46, on the outer periphery thereof, and this sealing means 51 operatively engages the bore 43. A pair of suitable O-ring sealing means 52 and 53 are operatively mounted around the pilot retainer 48 adjacent the upper and lower ends thereof, respectively, and they engage the bore 47.

As best seen in FIG. 4, the master spool pilot portion 46 is provided with a centrally located circular chamber or recess 54 which extends inwardly from the upper end thereof. The chamber 54 is connected by means of a plurality of radially disposed, outwardly extended passages 55 with the pilot bore or chamber 43, for exhausting pressurized air to the atmosphere. The bore 43 is exhausted to the atmosphere by means of the passageway 56 which is formed through the wall 57 of the pilot housing 12. The passageway 56 communicates with the atmosphere.

As best seen in FIG. 4, the pilot retainer 48 is provided with the centrally disposed, downwardly extended tubular extension 62 which is disposed within the pilot bore 54 in the pilot portion 46 of the master spool 27. A suitable O-ring sealing means 63 is mounted in the upper end of the pilot bore 54 and sealingly engages the outer periphery of the pilot retainer extension 62. As best seen in FIG. 4, the pilot retainer 48 is provided with an axial bore therethrough, generally indicated by the numeral 64. The pilot retainer bore 64 is provided with an enlarged portion 65 adjacent the upper end thereof. The enlarged bore portion 65 is connected by means of a plurality of radially disposed passageways 66, which are formed in the pilot retainer 48, with the enlarged pilot housing bore 47 in the pilot housing 12. It will be seen that the passages 66 are disposed between the O-ring sealing means 52 and 53. The pilot housing bore 47 is provided with a recessed annular groove 67 between the O-ring sealing means 52 and 53, and this groove 67 communicates with the passageways 66. The annular groove 67 communicates with the transverse bore 68 formed in the pilot housing 12, and the bore 68 further communicates with the inner end of the transversely extended enlarged bore 69. As shown in FIG. 4, the outer end of the bore 69 extends outwardly through the housing 12 and is open to the atmosphere, but it is normally plugged for the embodiment of FIG. 4 by means of the threaded plug 70.

Air under pressure is conducted from the air supply chamber 16 to the transverse bore 69 by the following described structure. As shown in FIGS. 3 and 4, the pilot housing 12 is provided with a downwardly extended passage 71 which communicates at the upper end thereof with the bore 69 and at the lower end thereof with the chamber 72. The lower end of the passageway 71 is provided with suitable thread 73 for the insertion of a plug therein to convert the valve of FIGS. 1 through 4 into an externally pilot operated valve of the type shown in FIGS. 5, 6 and 7. A vertical chamber 74 is formed in the valve body 10 and communicates at the upper end thereof with the chamber 72 in the pilot housing 12 to form an accumulator chamber. The lower end of the accumulator chamber 74 is connected by means of the reduced lower end portion 75 and the port or fixed orifice 76 with the supply chamber extension 77. The fixed orifice 76 provides a predetermined control over the flow of air into the accumulator chamber 74. It will be seen that air under pressure can thus pass from the supply chamber 16 and through the last described passageways and chambers to the bore 64 in the pilot retainer 48. The pilot retainer bore 64 is connected to the pilot housing bore 43 by means of a plurality of radially disposed ports 78 and passageway 79. Air under pressure can thus pass into the bore 43 and against the upper end of the master spool pilot portion 46 for shifting the master spool 27 downwardly. As shown in FIG. 4, the upper end of the master spool pilot portion 46 is provided with the central annular recess 80 which is disposed about the bore 54 and into which air under pressure is first passed for initial downward shifting movement of the master spool 27, after which air under pressure will engage the entire upper surface of the pilot portion end 46 and complete the downward shifting of the valve 27.

As shown in FIGS. 3 and 4, passage of air under pressure into the pilot chamber 43 for shifting the master spool 27 downwardly is controlled by means of the pilot spool valve 81 which is movably mounted in the pilot housing bore 64 and which is integrally connected to the armature 82 of a solenoid means generally indicated by the numeral 83. The solenoid 83 may be of any suitable type and it is operatively mounted in a housing 84 mounted on the upper end of the pilot housing 12. The solenoid housing 84 is detachably connected to the pilot housing 12 by any suitable means, as by means of the conventional retainer ring 85. A suitable O-ring sealing means 86 is mounted in the lower end of the solenoid housing 84 for sealing engagement with the upper end of the pilot housing 12.

As shown in FIGS. 1 and 3, a conduit housing 59 is formed on the pilot housing 12 and is enclosed by means of the plate 87 which is releasably secured in place by means of the screws 88. The solenoid 83 is provided with the usual lead wires 89 and 90 which pass downwardly through the pilot housing 12 and through the passageway 91 into the chamber 58 of the conduit housing 59 from whence they pass outwardly through the opening 60 in the conduit housing wall 61.

As shown in FIG. 4, the pilot retainer 48 is provided with the upwardly extended circular portion 92 which is provided with the central recess or spring seat 93. The retainer portion 92 extends upwardly and is seated within the tubular member 94 which has its lower end seated on the pilot retainer 48 and its upper end disposed adjacent the lower end of the solenoid 83. The pilot spool 81 is normally shifted upwardly to the inoperative position by means of the spring 95 which has the lower end thereof seated in the spring seat 93 and the upper end thereof abutting the washer 96. The washer 96 abuts the retainer ring 97 which is seated in a suitable peripheral groove 98 on the upper end of the pilot spool 81. The pilot spool 81 is provided with a retainer ring 99 on the lower end thereof which abuts against the lower end of the retainer extension 62.

As shown in FIG. 4, the pilot spool 81 is provided with an upper O-ring sealing means 100 which is adapted to sealingly engage the upper end of bore 64. The pilot spool 81 is provided with a second O-ring sealing means 101 which is spaced downwardly from the O-ring sealing means 100. The O-ring sealing means 101 engages the pilot retainer bore 64 at the point marked 102 when the pilot spool 81 is in the inoperative position shown in FIG. 4 so as to prevent air under pressure from passing downwardly into shifting engagement with the master spool pilot portion 46. When the pilot spool 81 is shifted downwardly, by means of the operation of the solenoid 83, the O-ring sealing means 101 will engage the pilot retainer bore 64 at the point marked by the numeral 103 so as to prevent leakage of air under pressure downwardly into the recess 54. Downward shifting of the pilot spool 81 permits air under pressure to pass from the bore 64 and through the ports 78 so as to engage the master spool 27 and shift it downwardly.

The internal pilot operated embodiment of FIGS. 1 through 4 may be used to control air under pressure for controlling an air cylinder, a press clutch, or the like, by connecting the cylinder chamber port 20 to the apparatus to be controlled and the supply chamber port 19 to a source of air under pressure. When the solenoid 83 is actuated, the pilot spool valve 81 is shifted downwardly against the pressure of spring 95, and air under pressure is permitted to pass through the passageways 66 into the bore 65, and thence through the ports 78 and into engagement with the pilot end portion 46 of the master spool valve 27. Air under pressure then flows from the supply chamber 16 and through the port 76, the passageway 75, the accumulator 74, the passageway 71, the bore 69, passageway 68 and then into the passageway 66. When the master spool 27 is shifted downwardly, the sealing means 45 on the master spool 27 will engage the valve seat 24 to block off flow of fluid under pressure from the cylinder chamber 17 into the exhaust chamber 15. The master spool valve portion or valve head 29 passes downwardly into the supply chamber 16 to open communication between the supply chamber 16 and the cylinder chamber 17. Air under pressure thus passes into the cylinder chamber 17 and on to the interconnecting conduits to the device to be controlled. The accumulator formed by the chambers 72 and 74 is formed to a size to hold at least double the volume of air required to shift the master spool 27 downwardly. The control orifice 76 which communicates the accumulator chamber 74 with the supply chamber 16 is made to a small size so that any pressure drop in the air supply chamber will not suddenly dissipate the pressure in the accumulator chamber 74. With the accumulator made to a size for holding a sufficient volume of air to shift the master spool 27, even though the pressure in the supply chamber 16 drops 50% from rated pressure, the air in the accumulator is still capable of shifting the master spool 27 downwardly. Without the accumulator chamber 74, if the pressure in the supply chamber dropped 50% when the valve is operating in the low end of its operating range, an external air supply would be required to shift the master spool 27 downwardly.

When it is desired to exhaust air under pressure from the device being controlled, the solenoid 83 is de-energized. The pilot spool return spring 95 returns the pilot spool 81 upwardly to the position shown in FIG. 4 to block further incoming air under pressure and permit the air in the pilot chamber 43 to exhaust through the chamber 54 and the passageway 55. The spring 39 returns the master spool 27 upwardly to the position shown in FIG. 3 so that the air can pass from the device being controlled and into the cylinder chamber 17 and then into the exhaust chamber 15. It will be seen that due to the in-line disposition of the various chambers of the valve, and the balanced spool valve 27 with its short stroke and poppet type seal 45, the valve can quickly dump a large volume of pressurized air from a device being controlled. It will also be seen that the pressure on the spool valve 27 is balanced for all positions of the same.

When the solenoid 83 is de-energized and the spool valve 27 is in the position shown in FIG. 3, the air in the supply chamber 16 operates on the sealing means 30 and 34 which are in sealing engagement with the equal diameter bores 26 and 33, respectively, to provide a balanced effect on the spool valve 27. During downward or upward shifting of the spool valve 27 the air under pressure operates on the sealing means 34 and 50 which engage the equal diameter bores 33 and 43, respectively, to provide a balanced effect on the spool valve 27. When the solenoid 83 is energized and the spool valve 27 is shifted downwardly to engage seal 45 on the seat 24, the air under pressure operates on the sealing means 45 and 34, which engage the equal diameter bores 23 and 33, respectively, to provide a balanced effect on the spool valve 27. The balanced poppet type spool valve 27 allows the exhaust of the valve to be restricted or muffled without adversely affecting the operation of the valve. The novel construction of the valve of the present invention provides a valve structure wherein there is no air pressure in the valve to create unbalanced forces on the spool valve 27 so as to shift it out of either operative position. The balanced spool valve 27 permits the valve to be used for many purposes including selector valve functions, and operations wherein all of the valve ports are under pressure.

The spring 39 is adapted to be overcome by high pressures and will resist downward movement of the master spool 27 only when the air under pressure in the supply chamber 16 is very low. The balanced master spool 27 of the present invention provides quick and efficient seating of the same with minimum seating pressure.

FIGS. 5, 6 and 7 show a second embodiment of the invention in which the pilot air for operating the master spool is provided and controlled from an external source and is admitted to and exhausted from the pilot chamber through the same port. The parts of the second embodiment which are similar to the parts of the first embodiment of FIGS. 1 through 4, are marked with the same reference numerals followed by the small letter "a." The only differences between the second embodiment of FIGS. 5 through 7 and the first aforedescribed embodiment are that the solenoid 83 and the pilot spool 81 have been deleted, and the passageway between the air supply chamber and the upper end of the master spool valve have been deleted. As shown in FIG. 7 in the second embodiment, the upper end of the pilot housing 12a is enclosed by means of a suitable end cap 104 which is releasably secured on the housing 12a by means of the conventional retainer ring 105. The pilot retainer 48 is provided with a central recess 106 which communicates with the upper end of the pilot portion 46a of the master spool valve 27a. The recess 106 is connected by means of the passageway 107 to the chamber 43a in the pilot housing 12a. The pilot housing chamber 43a is connected by means of the annular groove 108 and the passageway 109 to the inlet port 110 which is threaded and adapted to be connected to a suitable external source of fluid under pressure with suitable controls for controlling the flow of fluid under pressure into the port 110. The valve of the second embodiment as illustrated in FIGS. 5, 6 and 7 functions in the same manner as the first embodiment with the exception that the air under pressure which is passed into the recess 106 in the pilot retainer 48a is controlled from an external source for moving the master spool valve 27a downwardly, against the pressure of the spring 39a to seal off the cylinder chamber 17a from the exhaust chamber 15a.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A pilot operated three-way, air valve comprising:
   (a) a body having an exhaust chamber, a cylinder chamber, a pressurized air supply chamber, and, a separate inlet port connected to each of said chambers,
   (b) said chambers being vertically aligned with the exhaust chamber being disposed above said cylinder chamber and the supply chamber being disposed below said cylinder chamber,
   (c) a pilot housing on said body having a pilot chamber communicating with said exhaust chamber,
   (d) a first wall between said exhaust chamber and said cylinder chamber,
   (e) a second wall between said cylinder chamber and said supply chamber,
   (f) said first wall having a first circular opening therethrough to connect said exhaust chamber to said cylinder chamber, and, a horizontal poppet valve seat around the upper side of said first opening,
   (g) said second wall having a second circular opening therethrough, equal in diameter to the diameter of said first circular opening, to connect said cylinder chamber to said supply chamber, and, a radial vertical valve seat around the periphery of said second opening,
   (h) a master spool valve movably mounted in said body and extended through said exhaust, cylinder and supply chambers, and having a pilot portion extended into said pilot chamber,
   (i) said master spool valve having a pair of longitudinally spaced apart alternately operable flexible radial seal valve members, a first one of said valve members being radially formed to seat on said radical vertical valve seat to block communication between the cylinder chamber and the supply chamber, and a second one of said valve members being formed to seat on said horizontal valve seat to function as a poppet valve having a sealing diameter equal to the sealing diameter of said radially formed valve member to block communication between the cylinder chamber and the exhaust chamber,
   (j) means for normally biasing said master spool valve to a first position with said first valve member being operative to block communication between the cylinder chamber and the supply chamber and to communicate the cylinder chamber with the exhaust chamber, and
   (k) pilot means for conveying pressurized air into said pilot chamber for moving said master spool valve to a second position with said second valve member being operative to block communication between the cylinder chamber and the exhaust chamber and to communicate the cylinder chamber with the supply chamber.

2. A pilot operated three-way, air valve as defined in claim 1 wherein:
   (a) said means for normally biasing said master spool valve to a first position comprises a spring retainer mounted beneath said supply chamber, and a spring having one end seated on the spring retainer and the other end in engagement with the lower end of said master spool valve.

3. A pilot operated three-way, air valve as defined in claim 1 wherein:
   (a) the pilot portion and the lower end of said master spool valve are formed with equal diameters, and a sealing means is mounted between the pilot portion and the pilot housing, and between the lower end and valve body.

4. A pilot operated three-way, air valve as defined in claim 1 wherein:
   (a) said pilot means for conveying pressurized air into said pilot chamber comprises a pilot retainer in said pilot housing, a pressurized air inlet port in said pilot housing, and passages formed through said pilot housing and said pilot retainer to communicate said inlet port with said pilot chamber for admitting air under pressure into said pilot chamber and for exhausting air from said pilot chamber.

5. A pilot operated three-way, air valve as defined in claim 1, wherein:
   (a) the lower end of the supply chamber is enclosed by a third wall having a third opening therethrough,
   (b) said master spool valve having a lower end extended through said third opening,
   (c) sealing means mounted between the master spool valve pilot chamber, and between the master spool valve and the openings in said third wall,
   (d) the openings in said walls being equal in cross sectional size to each other and to said pilot chamber, whereby the air pressure in said valve acting on the master spool valve is balanced for all positions of the master spool valve, and,
   (e) said means for biasing said master spool valve to a first position includes a spring means for assisting the pressurized air in the supply chamber to move the master spool valve to said first position.

6. A pilot operated three-way air valve comprising:
   (a) a body having an exhaust chamber, a cylinder chamber, a pressurized air supply chamber, and, a separate inlet port connected to each of said chambers,
   (b) said chambers being vertically aligned with the exhaust chamber being disposed above said cylinder chamber and the supply chamber being disposed below said cylinder chamber,
   (c) a pilot housing on said body having a pilot chamber communicating with said exhaust chamber,
   (d) a first wall between said exhaust chamber and said cylinder chamber, (e) a second wall between said cylinder chamber and said supply chamber, (f) said first wall having a first opening therethrough to connect said exhaust chamber to said cylinder chamber, and, a horizontal poppet valve seat around the upper side of said first opening, (g) said second wall having a second opening therethrough to connect said cylinder chamber to said supply chamber, and, a radial, vertical valve seat around the periphery of said second opening, (h) a master spool valve movably mounted in said body and extended through said exhaust, cylinder and supply chambers, and having a pilot portion extended into said pilot chamber, (i) said master spool valve having a pair of longitudinally spaced apart alternately operable flexible radial seal valve members, a first one of said valve members being radially formed to seat on said vertical valve seat to block communication between the cylinder chamber and the supply chamber, and a second one of said valve members being formed to seat on said horizontal valve seat to block communication between the cylinder chamber and the exhaust chamber, (j) means for normally biasing said master spool valve to a first position with said first valve member being operative to block communication between the cylinder chamber and the supply chamber and to communicate the cylinder chamber with the exhaust chamber, (k) pilot means for conveying pressurized air into said pilot chamber for moving said master spool valve to a second position with said second valve member being operative to block communication between the cylinder chamber and the exhaust chamber and to communicate the cylinder chamber with the supply chamber, and, (l) said pilot means comprising, a pilot retainer in said pilot housing, a first set of passageways formed through said body and pilot housing and said pilot retainer to communicate said supply chamber with said pilot chamber for admitting air under pressure into said pilot chamber, a second set of passageways formed through said pilot housing and the pilot portion of said master spool valve for exhausting air from said pilot chamber, a pilot spool valve for alternately controlling the flow of air through the first and second set of passageways, and means for operating the pilot spool valve.

7. A pilot operated three-way, air valve as defined in claim 6, wherein:

(a) said means for operating said pilot spool valve comprises a solenoid means.

8. A pilot operated three-way, air valve as defined in claim 6, wherein:

(a) said first set of passageways includes an accumulator chamber interconnected between said supply chamber and said pilot chamber, and a fixed flow control orifice connecting said supply chamber to said accumulator chamber.

References Cited by the Examiner

UNITED STATES PATENTS

| | | | |
|---|---|---|---|
| 1,630,133 | 5/1927 | Murphy | 251—282 X |
| 2,716,425 | 8/1955 | Yarber | 137—625.64 |
| 3,131,722 | 5/1964 | Abbott et al. | 137—625.6 |
| 3,142,315 | 7/1964 | Hennell | 137—625.26 |

FOREIGN PATENTS 864,479   4/1941   France.

MARTIN P. SCHWADRON, *Acting Primary Examiner.*